US012638797B2

(12) United States Patent
Hisadome et al.

(10) Patent No.: US 12,638,797 B2
(45) Date of Patent: May 26, 2026

(54) FIXING ROTATING MEMBER, FIXING DEVICE, ELECTROPHOTOGRAPHIC IMAGE FORMING APPARATUS, METHOD FOR MANUFACTURING FIXING ROTATING MEMBER, AND CONDUCTIVE MEMBER

(71) Applicant: CANON KABUSHIKI KAISHA, Tokyo (JP)

(72) Inventors: Kosei Hisadome, Kanagawa (JP); Akira Okano, Kanagawa (JP); Matsutaka Maeda, Kanagawa (JP); Mizuki Kawabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/013,093

(22) Filed: Jan. 8, 2025

(65) Prior Publication Data

US 2025/0231511 A1 Jul. 17, 2025

(30) Foreign Application Priority Data

Jan. 15, 2024 (JP) ................................ 2024-003896

(51) Int. Cl.
*G03G 15/20* (2006.01)

(52) U.S. Cl.
CPC ....... *G03G 15/2057* (2013.01); *G03G 15/206* (2013.01); *G03G 15/2064* (2013.01); *G03G 2215/2025* (2013.01)

(58) Field of Classification Search
CPC ....... G03G 15/2057; G03G 2215/2035; G03G 15/2064; G03G 15/2053
See application file for complete search history.

(56) References Cited

U.S. PATENT DOCUMENTS

| | | | |
|---|---|---|---|
| 8,099,035 B2 | 1/2012 | Qi et al. | |
| 8,311,468 B2 | 11/2012 | Qi et al. | |
| 10,802,433 B1 | 10/2020 | Watanabe et al. | |
| 11,467,520 B2 | 10/2022 | Kitano et al. | |
| 2009/0067874 A1* | 3/2009 | Hoshio .............. | G03G 15/0225 399/100 |
| 2013/0078470 A1 | 3/2013 | Murase et al. | |
| 2019/0094772 A1* | 3/2019 | Sato ................... | G03G 15/2057 |
| 2021/0063905 A1* | 3/2021 | Kawamura .......... | G03G 9/0902 |
| 2024/0160135 A1 | 5/2024 | Maeda et al. | |
| 2024/0160136 A1 | 5/2024 | Okano et al. | |

FOREIGN PATENT DOCUMENTS

| | | |
|---|---|---|
| JP | 2005-157004 A | 6/2005 |
| JP | 2011-107704 A | 6/2011 |
| JP | 2013-68788 A | 4/2013 |
| JP | 2021-51136 A | 4/2021 |

* cited by examiner

*Primary Examiner* — Jessica L Eley
(74) *Attorney, Agent, or Firm* — Venable LLP

(57) ABSTRACT

A fixing rotating member comprising: a base material including a resin; and a heat generating layer on the base material, wherein the heat generating layer extends in the circumferential direction of an outer peripheral surface of the base material; the heat generating layer comprises silver; at least one void is present in a cross section of the heat generating layer in a direction along the circumferential direction; and when the heat generating layer is analyzed by an X-ray photoelectron spectroscopy device at a pitch of 375 nm in the depth direction from a surface side opposite to the side facing the base material, a tellurium oxide peak is confirmed throughout the entire thickness of the heat generating layer.

7 Claims, 8 Drawing Sheets

FIXING ROTATING MEMBER, FIXING DEVICE, ELECTROPHOTOGRAPHIC IMAGE FORMING APPARATUS, METHOD FOR MANUFACTURING FIXING ROTATING MEMBER, AND CONDUCTIVE MEMBER

BACKGROUND OF THE INVENTION

Field of the Invention

The present disclosure relates to a fixing rotating member to be used in a fixing device of an electrophotographic image forming apparatus such as an electrophotographic copying machine or printer, and also to a fixing device, an electrophotographic image forming apparatus, a method for manufacturing the fixing rotating member, and a conductive member.

Description of the Related Art

A fixing device installed in an electrophotographic image forming apparatus such as an electrophotographic copying machine or printer generally heats a recording material bearing an unfixed toner image while conveying the recording material in a nip formed by a heated fixing rotating member and a pressure roller in contact with the fixing rotating member, thereby fixing the toner image to the recording material.

An electromagnetic induction type fixing device which has a heat generating layer on a fixing rotating member and can directly cause the heat generating layer to generate heat has been developed and put into practical use. The advantage of the electromagnetic induction type fixing device is that it has a short warm-up time.

A conductive layer for a fixing member is required to have conductivity and durability against repeated distortion under heating. For example, Japanese Patent Application Publication No. 2021-051136 discloses a fixing member having a conductive layer formed by copper plating.

SUMMARY OF THE INVENTION

In anticipation of reduction in uneven heat generation, the inventors attempted to apply nanoink, which allows fine control of line width and space, when forming a heat generating layer. The heat generating layer formed with nanoink has voids. The presence of voids is expected to improve adhesion due to the anchor effect when forming a resin layer such as a protective layer.

Meanwhile, when paper of different sizes is inserted into a fixing member, there is a phenomenon in which the temperature of the member rises at the end where the paper does not pass, which is the so-called non-paper-passing area. The fixing member performs heating to maintain the fixing temperature at all times in order to reliably fix the toner in the paper passing area where the paper passes. In the paper passing area, the paper passes while absorbing heat, so continuous heating is required. Meanwhile, in the non-paper-passing area, since there is no heat exchange due to the passage of paper, the temperature of the member may become higher than the set temperature. This phenomenon is particularly likely to occur in special usage environments such as continuous printing of small size paper.

The inventors have confirmed the problem that when a fixing member with a heat generating layer produced using nanoink is used, where a high-temperature state with a temperature equal to or higher than the set temperature continues for a long time in the non-paper-passing area, the resistance of the heat generating layer increases. Where such an increase in resistance occurs in the non-paper-passing area of small size paper, unevenness occurs in the amount of heat generated by electromagnetic induction, and when fixing to larger size paper, the fixing performance at the edge of the paper is degraded.

The present disclosure is directed to a fixing rotating member that has excellent durability even in a printing environment where a high-temperature state continues for a long time. The present disclosure is also directed to a fixing device and an electrophotographic image forming apparatus equipped with the fixing rotating member. The present disclosure is also directed to a method for manufacturing the fixing rotating member. The present disclosure is also directed to a conductive member that can suppress the increase in resistance at high temperatures.

The present disclosure relates to a fixing rotating member comprising:

a base material including a resin; and a heat generating layer on the base material, wherein the heat generating layer extends in the circumferential direction of an outer peripheral surface of the base material;

the heat generating layer comprises silver;

at least one void is present in a cross section of the heat generating layer in a direction along the circumferential direction; and when the heat generating layer is analyzed by an X-ray photoelectron spectroscopy device at a pitch of 375 nm in the depth direction from a surface side opposite to the side facing the base material, a tellurium oxide peak is confirmed throughout the entire thickness of the heat generating layer.

Also, the present disclosure relates to a fixing device comprising:

the above fixing rotating member, and an induction heating device that causes the fixing rotating member to generate heat by induction heating.

Also, the present disclosure relates to an electrophotographic image forming apparatus comprising:

an image bearing member that bears toner image;

a transfer device that transfers the toner image to a recording material; and a fixing device that fixes the transferred toner image to the recording material, wherein the fixing device is the above fixing device.

Also, the present disclosure relates to a method for manufacturing the above fixing rotating member, the method comprising the steps of:

preparing a laminate in which the heat generating layer is formed on the base material;

impregnating the heat generating layer with a tellurium solution including tellurium from the surface side of the heat generating layer opposite to the side facing the base material; and heating to 200° C. or higher after impregnation with the tellurium solution.

Also, the present disclosure relates to a conductive member comprising a base material and a heat generating layer on the base material, wherein the heat generating layer includes silver;

at least one void is present in a cross section of the heat generating layer in a thickness direction; and when the heat generating layer is analyzed by an X-ray photoelectron spectroscopy device at a pitch of 375 nm in the depth direction from a surface side opposite to the side facing the base material, a tellurium oxide peak is confirmed throughout the entire thickness of the heat generating layer.

According to the present disclosure, there is provided a fixing rotating member that has excellent durability even in a printing environment where a high-temperature state continues for a long time. Also, according to the present disclosure, there is provided a fixing device and an electrophotographic image forming apparatus equipped with the fixing rotating member. Also, according to the present disclosure, there is provided a method for manufacturing the fixing rotating member. Also, according to the present disclosure, there is provided a conductive member that can suppress the increase in resistance at high temperatures.

Further features of the present invention will become apparent from the following description of exemplary embodiments with reference to the attached drawings.

DESCRIPTION OF THE EMBODIMENTS

Figure 1:
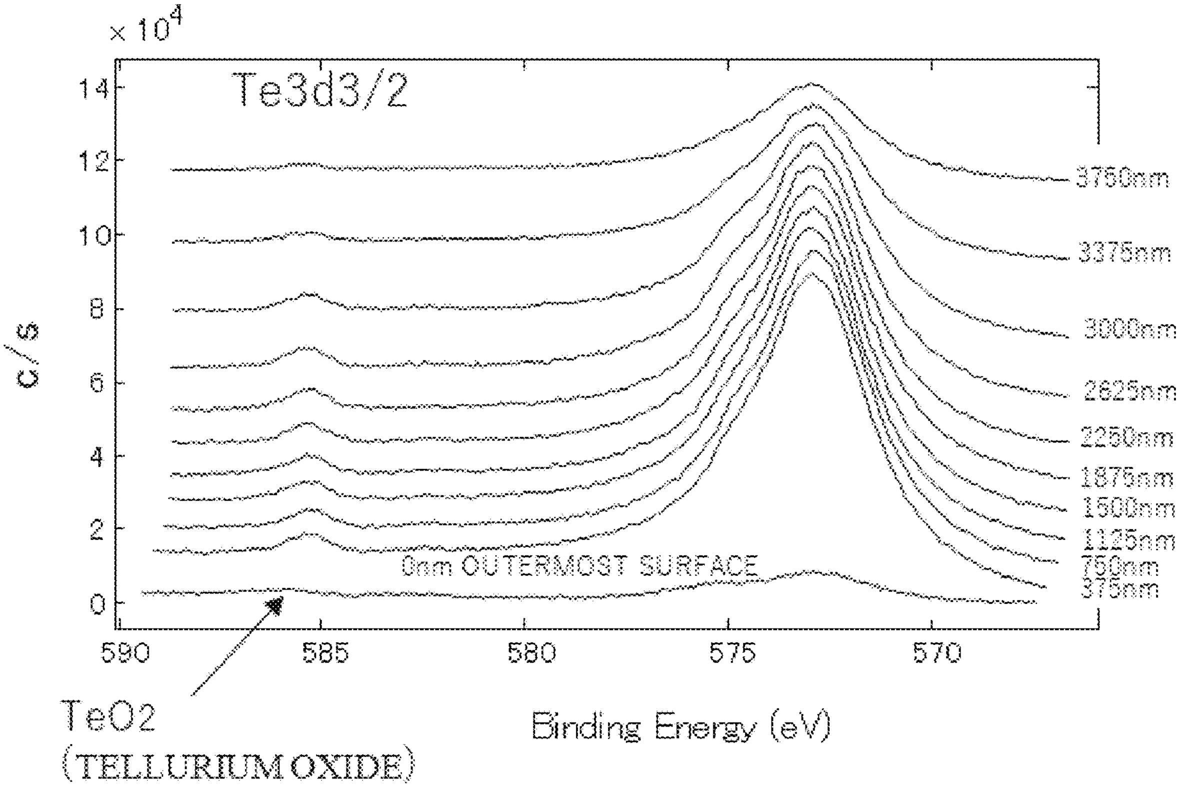
FIG. 1 is an example of a depth spectrum of an X-ray photoelectron spectroscopy device showing tellurium oxide.

Unless otherwise specified, descriptions of numerical ranges such as "from XX to YY" or "XX to YY" in the present disclosure include the numbers at the upper and lower limits of the range. When numerical ranges are described in stages, the upper and lower limits of each of each numerical range may be combined arbitrarily. In the present disclosure, wording such as "at least one selected from the group consisting of XX, YY and ZZ" means any of: XX; YY; ZZ; a combination of XX and YY; a combination of XX and ZZ; a combination of YY and ZZ; or a combination of XX and YY and ZZ.

A fixing rotating member that has a heat generating layer, and a fixing device and an image forming apparatus equipped with the fixing rotating member according to the present disclosure will be described in detail hereinbelow based on specific configurations thereof.

The present disclosure relates to a fixing rotating member comprising:

a base material including a resin; and a heat generating layer on the base material, wherein the heat generating layer extends in the circumferential direction of an outer peripheral surface of the base material;

the heat generating layer comprises silver;

at least one void is present in a cross section of the heat generating layer in a direction along the circumferential direction; and when the heat generating layer is analyzed by an X-ray photoelectron spectroscopy device at a pitch of 375 nm in the depth direction from a surface side opposite to the side facing the base material, a tellurium oxide peak is confirmed throughout the entire thickness of the heat generating layer.

As described above, when a fixing member with a heat generating layer produced using nanoink is used, where a high-temperature state with a temperature equal to or higher than the set temperature continues for a long time in the non-paper-passing area, the resistance of the heat generating layer may increase. Since some of the voids formed as a result of using nanoink are connected, it is thought that where the high-temperature state continues, oxidation will progress throughout the entire heat generating layer, causing the resistance to increase.

The inventors have found that by including tellurium oxide in the heat generating layer, it is possible to suppress the increase in the resistance of the heat generating layer even when the high-temperature state continues for a long time. Specifically, when the heat generating layer is analyzed with an X-ray photoelectron spectroscopy device at a pitch of 375 nm in the depth direction from the surface side opposite to the side facing the base material, it is necessary that a tellurium oxide peak be confirmed throughout the entire thickness of the heat generating layer.

The inventors believe that the reason why tellurium oxide can suppress the increase in resistance of the heat generating layer is that tellurium oxide covers the inner surface formed by the voids in the heat generating layer, thereby forming a barrier layer, which reduces the amount of oxygen that the heat generating layer itself comes into contact with, and therefore the increase in resistance can be suppressed even in a high-temperature state.

A fixing rotating member having the heat generating layer, and a fixing device and an electrophotographic image forming apparatus manufactured using the same will be described in detail below based on specific configurations.

However, the dimensions, materials, shapes, and relative arrangement of the components described in the embodiments should be changed, as appropriate, according to the configuration of the members and various conditions to which the disclosure is applied. That is, the scope of this disclosure is not intended to be limited to the following embodiments. Further, in the following description, configurations having the same functions are given the same reference numbers in the drawings, and the description thereof may be omitted.

Electrophotographic Image Forming Apparatus

An electrophotographic image forming apparatus (hereinafter also simply referred to as an "image forming apparatus") includes an image bearing member that bears a toner image, a transfer device that transfers the toner image onto a recording material, and a fixing device for fixing the transferred toner image to the recording material.

Figure 2:
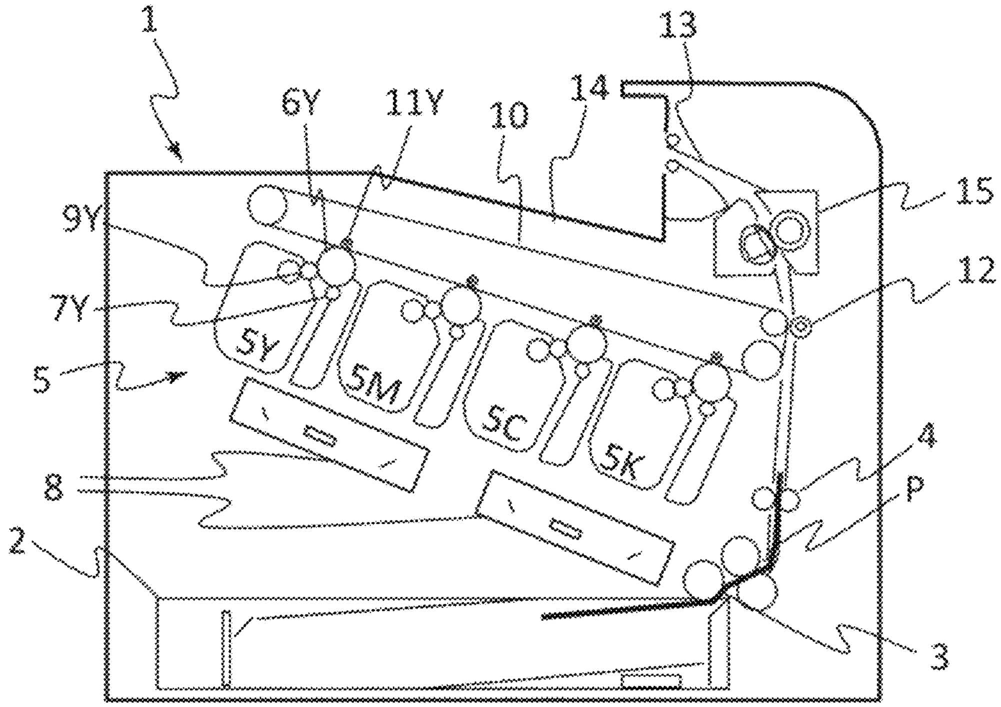
FIG. 2 is a schematic view of an electrophotographic image forming apparatus according to an embodiment.

FIG. 2 is a cross-sectional view showing the overall configuration of a color laser beam printer (hereinafter, printer) 1 as an example of an image forming apparatus equipped with a fixing device (image heating device) 15 according to the embodiment. A cassette 2 is housed in the lower part of the printer 1 so that the cassette can be pulled out. Sheets P as recording materials are stacked and accommodated in the cassette 2. The sheets P in the cassette 2 are fed to registration rollers 4 while being separated one by one by separation rollers 3.

A variety of sheets of different sizes and materials can be used as the sheet P, which is the recording material, examples thereof including paper such as plain paper and thick paper, surface-treated sheet materials such as plastic films, cloth, and coated paper, and special-shaped sheet materials such as envelopes and index paper.

The printer 1 includes an image forming unit 5 as image forming means in which image forming stations 5Y, 5M, 5C, and 5K corresponding to the respective colors of yellow, magenta, cyan, and black are arranged in a horizontal row. The image forming station 5Y is provided with a photosensitive drum 6Y, which is an image bearing member (electrophotographic photosensitive member) for bearing a toner image, and a charging roller 7Y as charging means for uniformly charging the surface of the photosensitive drum 6Y.

Further, a scanner unit 8 is arranged below the image forming unit 5. The scanner unit 8 irradiates the photosensitive drum 6Y with a laser beam that is ON/OFF-modulated in accordance with a digital image signal that is input from an external device such as a computer (not shown) on the basis of image information and generated by image processing means, thereby forming an electrostatic latent image on the photosensitive drum. Further, the image forming station 5Y includes a developing roller 9Y as developing means for attaching toner to the electrostatic latent image on the photosensitive drum 6Y and developing the latent image into a toner image, and a primary transfer section 11Y that transfers the toner image on the photosensitive drum 6Y to an intermediate transfer belt 10.

On the toner image on the intermediate transfer belt 10 to which the toner image has been transferred by the primary transfer section 11Y, toner images formed in the other image forming stations 5M, 5C, and 5K in a similar process are multiple-transferred. A full-color toner image is thereby formed on the intermediate transfer belt 10. This full-color toner image is transferred onto the sheet P by a secondary transfer section 12 as transfer means. The primary transfer section 11Y and the secondary transfer section 12 are examples of a transfer device that transfers the toner image onto the transfer belt 10 or the recording material.

After that, the toner image transferred onto the sheet P (on the recording material) passes through the fixing device 15 and is fixed as a fixedly attached image. Further, the sheet P passes through the discharging/transporting section 13 and is discharged and stacked on a stacking section 14.

The image forming unit 5 is an example of the image forming means, and for example, a configuration of a direct transfer type in which a toner image is directly transferred from an image bearing member to a sheet P, or configuration of a monochrome type in which toner of only one color is used may be used.

Fixing Device

Figure 3:
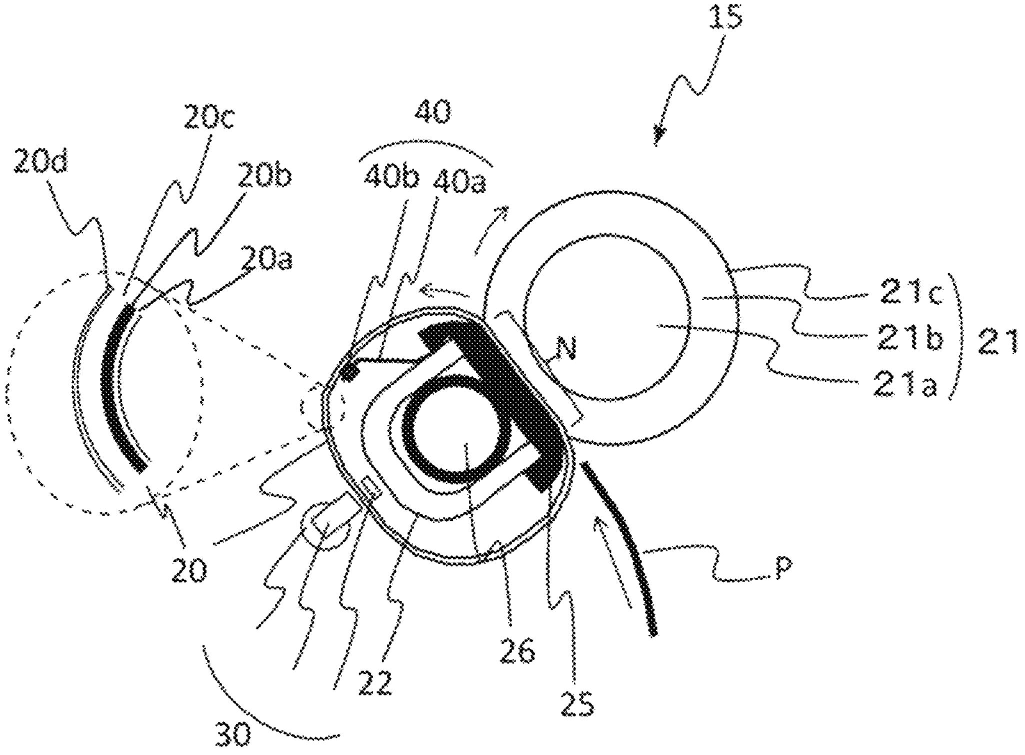
FIG. 3 is a schematic view of a cross-sectional configuration of a fixing device according to an embodiment.
Figure 4:
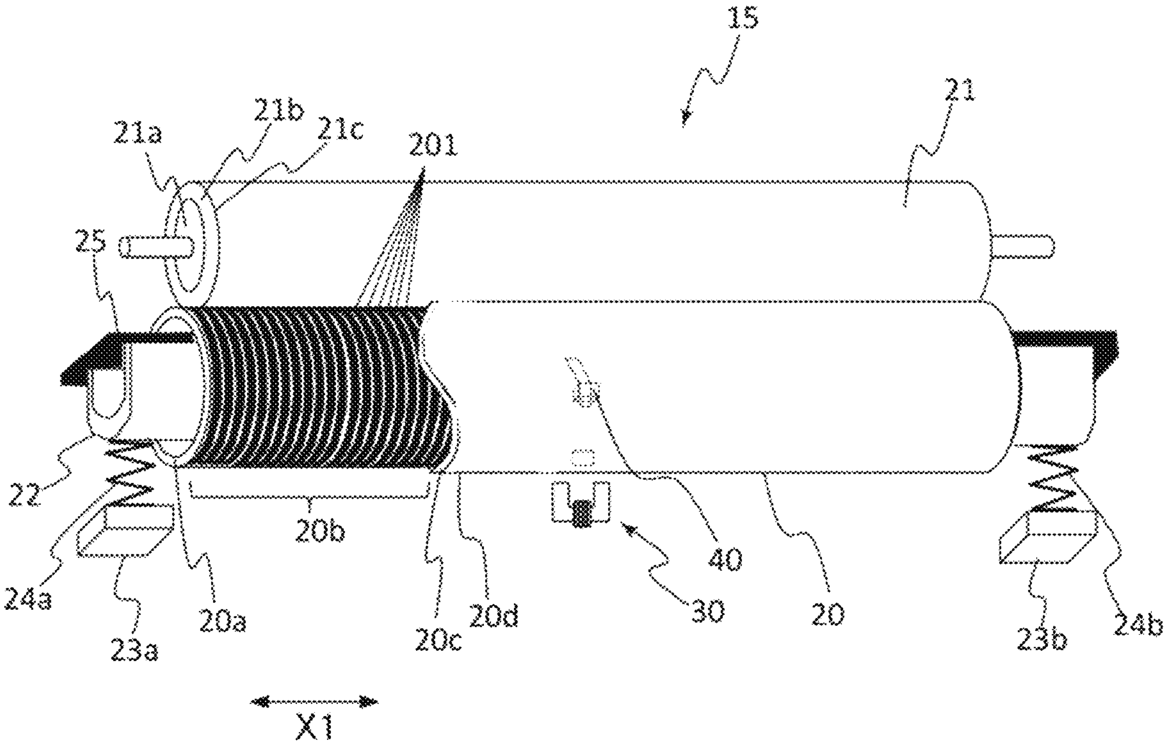
FIG. 4 is a schematic view of a cross-sectional configuration of a fixing device according to an embodiment.

The fixing device 15 of the present embodiment is an induction heating type fixing device (image heating device) that causes the fixing rotating member to generate heat by electromagnetic induction. FIG. 3 shows a cross-sectional configuration of the fixing device 15, and FIG. 4 is a perspective view of the fixing device 15. A housing of the fixing device 15 and the like are omitted in FIGS. 3 and 4. In the following description, with respect to the members constituting the fixing device 15, the longitudinal direction X1 is a direction perpendicular to the transport direction of the recording material and the thickness direction of the recording material.

The fixing device 15 includes a fixing rotating member 20, a film guide 25, a pressure roller 21, a pressure stay 22, a magnetic core 26, an excitation coil 27 (FIG. 5), a thermistor 40 and a current sensor 30. The fixing device 15 heats the recording material on which the image is formed to fix the image onto the recording material. The fixing rotating member 20 is the rotating body of the present embodiment, and the pressure roller 21 is the opposing member of the present embodiment. Also, the excitation coil 27 functions as magnetic field generating means of the present embodiment. Details of the fixing rotating member will be described hereinbelow.

The fixing rotating member 20 has a heat generating layer 20*b* on a base material. The heat generating layer 20*b* can generate heat by, for example, an induced current. In the heat generating layer 20*b*, heat generating rings 201 (FIG. 4), which are electrically connected and formed in a ring shape in the circumferential direction and are electrically divided in the longitudinal direction X1 (rotation axis direction of the fixing rotating member 20), are formed as a heat generating pattern aligned in the longitudinal direction. In other words, the heat generating layer 20*b* is divided into a plurality of annular regions which are connected to each other in the circumferential direction of the fixing rotating member 20 and which are not mutually conductive in the rotation axis direction of the fixing rotating member 20. Each heat generating ring 201, which is a component of the heat generating pattern, is formed with a uniform width in the longitudinal direction X1.

The pressure roller 21 as a facing member (pressing member) facing the fixing rotating member 20 includes a metal core 21*a* and an elastic layer 21*b* that is concentrically and integrally molded and coated around the metal core in a roller shape, and is provided with a release layer 21*c* as a surface layer. The elastic layer 21*b* is preferably made of a material having good heat resistance, such as silicone rubber, fluororubber, or fluorosilicone rubber. Both ends of the metal core 21*a* in the longitudinal direction are installed to be rotatably held by conductive bearings between metal plates (not shown) on the device chassis side.

Further, as shown in FIG. 4, pressure springs 24*a* and 24*b* are contracted between both ends of the pressure stay 22 in the longitudinal direction and spring receiving members 23*a* and 23*b* on the device chassis side, respectively, thereby applying a pressing force to the pressure stay 22.

In the fixing device 15 of the present embodiment, a total pressing force of approximately from 100N to 300N (from approximately 10 kgf to approximately 30 kgf) is applied. As a result, the lower surface of the film guide 25 made of a heat-resistant resin PPS or the like and the upper surface of the pressure roller 21 are pressed toward each other while sandwiching the fixing rotating member 20, which is a cylindrical rotating member, to form a fixing nip portion N having a predetermined width.

The film guide 25 functions together with the pressure roller 21 as nip portion forming members that form a nip portion for nipping and transporting the recording material that bears a toner image with the fixing rotating member 20 interposed therebetween. Here, PPS is polyphenylene sulfide.

The pressure roller 21 is driven to rotate clockwise by driving means (not shown), and a counterclockwise rotational force acts on the fixing rotating member 20 due to the frictional force with the outer surface of the fixing rotating member 20. As a result, the fixing rotating member 20 rotates while sliding on the film guide 25.

Figure 5:
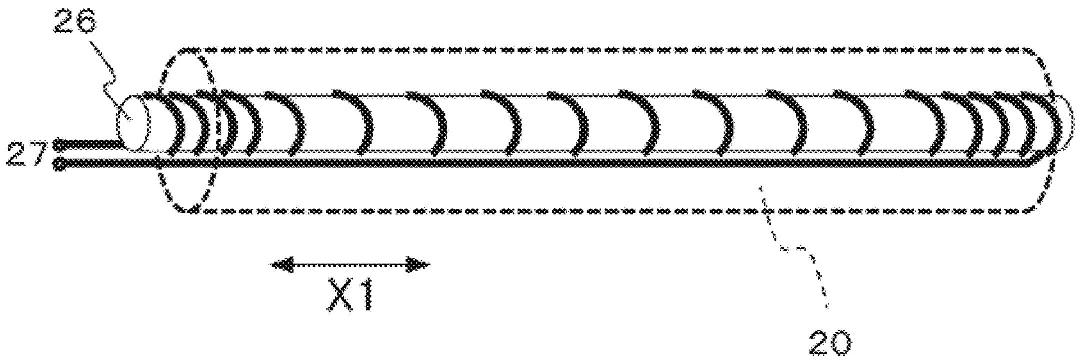
FIG. 5 is a schematic view of a magnetic core and an excitation coil of a fixing device according to an embodiment.

FIG. 5 is a schematic diagram of the magnetic core 26 and the excitation coil 27 in FIG. 3, and the fixing rotating member 20 is shown in the figure by a dashed line in order to explain the positional relationship with the fixing rotating member 20. The induction heating device in the induction heating type fixing device that causes the fixing rotating member 20 to generate heat by electromagnetic induction may include a magnetic core 26 and an excitation coil 27.

The excitation coil 27 is arranged inside the fixing rotating member 20. The excitation coil 27 has a helical portion with a helical axis substantially parallel to the rotation axis of the fixing rotating member 20, and forms an alternating magnetic field that causes the heat generating layer 20*b* to generate heat by electromagnetic induction. "Substantially parallel" means not only that the two axes are perfectly parallel, but also that a slight deviation is allowed to the extent that the heat generating layer can generate heat by electromagnetic induction.

The magnetic core 26 is arranged in the helical portion and extends in the rotation axis direction of the fixing rotating member 20 so as not to form a loop outside the fixing rotating member 20. The magnetic core 26 induces lines of magnetic force of an alternating magnetic field.

In FIG. 5, the magnetic core 26 is inserted through the hollow portion of the fixing rotating member 20, which is a cylindrical rotating body. Further, the excitation coil 27 is spirally wound around the outer periphery of the magnetic core 26 and extends in the longitudinal direction of the fixing rotating member 20. The magnetic core 26 has a columnar shape and is fixed by fixing means (not shown) so as to be positioned substantially in the center of the fixing rotating member 20 in a cross-section viewed in the longitudinal direction (see FIG. 3).

The magnetic core 26 provided inside the excitation coil 27 acts to guide the lines of magnetic force (magnetic flux) of the alternating magnetic field generated by the excitation coil 27 to the inner side of the heat generating layer 20*b* of the fixing rotating member 20 and to form a path (magnetic path) of the lines of magnetic force. The material of the magnetic core 26 is preferably a material with low hysteresis loss and high relative permeability, for example, at least one soft magnetic material having a high magnetic permeability selected from the group consisting of baked ferrite, ferrite resin, and the like.

The magnetic core 26 may have any cross-sectional shape that can be accommodated in the hollow portion of the fixing rotating member 20, and does not need to be circular, but preferably has a shape that allows the cross-sectional area to be as large as possible. In the present embodiment, the magnetic core 26 has a diameter of 10 mm and a longitudinal length of 280 mm.

The excitation coil 27 is formed by spirally winding a copper wire material (single conductive wire) with a diameter of 1 mm to 2 mm that is coated with a heat-resistant polyamideimide around the magnetic core 26 with 20 turns. The excitation coil 27 is wound around the magnetic core 26 in a direction intersecting the rotation axis direction of the fixing rotating member 20. Therefore, where a high-frequency alternating current is passed through the excitation coil 27, an alternating magnetic field is generated in a direction parallel to the rotation axis direction, and an induced current (circulating current) flows in each heat generating ring 201 of the heat generating layer 20*b* of the fixing rotating member 20 according to the principle described hereinbelow and heat is generated therein.

As shown in FIGS. 3 and 4, the thermistor 40 as temperature detection means for detecting the temperature of the fixing rotating member 20 is composed of a spring plate 40*a* and a thermistor element 40*b*. The spring plate 40*a* is a support member having spring elasticity extending toward the inner surface of the fixing rotating member 20. The thermistor element 40*b* as a temperature detecting element is installed at the tip of the spring plate 40*a*. The surface of the thermistor element 40*b* is covered with a 50 μm thick polyimide tape to ensure electrical insulation.

The thermistor 40 is installed by fixedly attaching to the film guide 25 at a substantially central position of the fixing rotating member 20 in the longitudinal direction. The thermistor element 40*b* is pressed against the inner surface of the fixing rotating member 20 and held in contact therewith by spring elasticity of the spring plate 40*a*. The thermistor 40 may be arranged on the outer peripheral side of the fixing rotating member 20.

The current sensor 30 constituting a conduction monitoring device for monitoring conduction in the circumferential direction of the heat generating layer 20*b* is arranged at the same position as the thermistor 40 in the longitudinal direction of the fixing device 15. That is, the current sensor 30 monitors the conduction state of the heat generating ring 201 at the position in contact with the thermistor element 40*b*, among the plurality of heat generating rings 201 forming the heat generating pattern of the fixing rotating member 20.

Heating Principle

Figure 6:
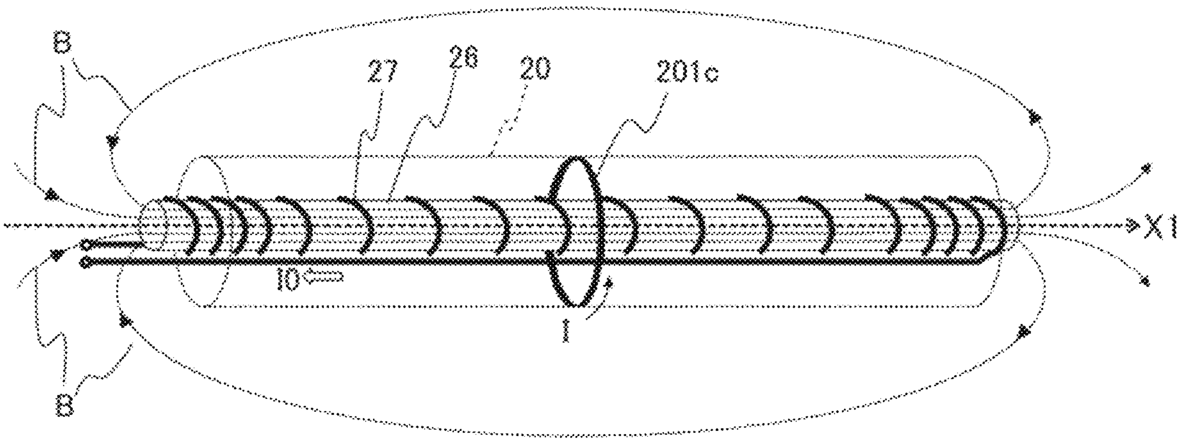
FIG. 6 is a diagram representing a magnetic field formed when a current is passed through an excitation coil according to an embodiment.

The heating principle of the fixing rotating member 20 in the induction heating type fixing device 15 will be described hereinbelow. FIG. 6 is a conceptual diagram showing the moment when the current in the excitation coil 27 increases in the direction of an arrow 10. The excitation coil 27 is inserted into the fixing rotating member 20 and functions as magnetic field generating means that forms an alternating magnetic field in the rotation axis direction of the fixing rotating member 20 when an alternating current is passed therethrough, thereby generating an induced current I in the circumferential direction of the fixing rotating member 20.

Further, the magnetic core 26 functions as a member that guides the lines B of magnetic force (dotted lines in the figure) generated by the excitation coil 27 and forms a magnetic path. In a general induction heating method, the lines of magnetic force pass through the heat generating layer to generate an eddy current, whereas in the configuration of the present embodiment, the lines B of magnetic force form loops outside the fixing rotating member. That is, heat is mainly generated in the heat generating layer 20*b* by the induced current induced by the lines of magnetic force that exit from one longitudinal end of the magnetic core 26, pass outside the heat generating layer 20*b*, and return to the other longitudinal end of the magnetic core 26. By doing so, heat can be efficiently generated even if the thickness of the heat generating layer is as small as, for example, 5 μm or less.

Where an alternating magnetic field is generated by the excitation coil 27, an induced current I according to Faraday's law flows through each heat generating ring 201 of the heat generating layer 20*b* of the fixing rotating member 20. Faraday's law states that "where a magnetic field in a circuit is changed, an induced electromotive force is generated that causes a current to flow in the circuit, and the induced electromotive force is proportional to the time change of the magnetic flux that runs vertically through the circuit."

For a heat generating ring 201*c* located in the central portion in the longitudinal direction of the magnetic core 26 shown in FIG. 6, the induced current I that flows through the heat generating ring 201*c* when a high-frequency alternating current is passed through the excitation coil 27 is considered hereinbelow. When the high-frequency alternating current is passed through, an alternating magnetic field is formed inside the magnetic core 26. At this time, the induced electromotive force acting on the heat generating ring 201*c* is proportional to the time change of the magnetic flux running vertically through the inside of the heat generating ring 201*c* according to Equation 1 below.

$$V = -N\frac{\Delta\Phi}{\Delta t} \qquad \text{Equation 1}$$

V: induced electromotive force,

N: number of coil turns, $\Delta\Phi/\Delta t$: change in magnetic flux running vertically in the circuit (heat generating ring 201*c*) in minute time $\Delta t$.

Due to this induced electromotive force V, an induced current I, which is a circulating current that circulates in the heat generating ring 201*c*, flows, and Joule heat generated by the induced current I causes the heat generating ring 201*c* to generate heat. However, where the heat generating ring 201*c* is disconnected, the induced current I does not flow and the heat generating ring 201*c* does not generate heat.

(1) Schematic Configuration of Fixing Rotating Member

The details of the fixing rotating member of the present embodiment will be described with reference to the drawings.

The fixing rotating member according to one aspect of the present disclosure can be, for example, a rotatable member such as an endless belt. The fixing rotating member includes a base material containing a resin and a heat generating layer on the base material. The fixing rotating member includes, as necessary, a protective layer on the surface of the heat generating layer opposite to the surface facing the base material.

Figure 7:
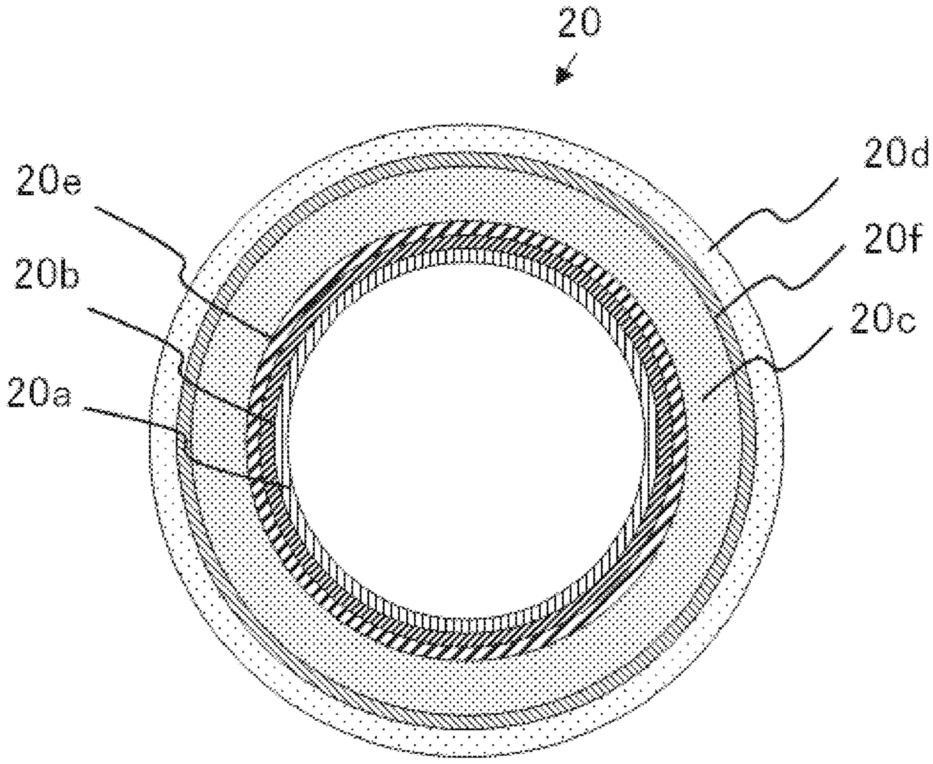
FIG. 7 is a cross-sectional configuration view of a fixing rotating member according to an embodiment.

FIG. 7 is a circumferential cross-sectional view of the fixing rotating member. As shown in FIG. 7, the fixing rotating member has a base material 20*a*, a heat generating layer 20*b* on the outer surface of the base material 20*a*, and as necessary, a protective layer 20*e* on the outer surface of the heat generating layer. An elastic layer 20*c* and a surface layer (release layer) 20*d* may be further provided, as necessary, on the protective layer 20*e*, and an adhesive layer 20*f* may be provided between the elastic layer 20*c* and the surface layer 20*d*.

(2) Base Material

The material of the base material 20*a* is not particularly limited. The base material 20*a* contains a resin (preferably a heat-resistant resin). When a belt is used in the electromagnetic induction type fixing device, the base material 20*a* is preferably a layer that maintains high strength with little change in physical properties when the heat generating layer generates heat. For this reason, the base material 20*a* preferably contains a heat-resistant resin as a main component and is more preferably made of a heat-resistant resin.

The resin contained in the base material 20*a* (preferably the resin constituting the base material) preferably contains at least one selected from the group consisting of polyimides (PI), polyamideimides (PAI), modified polyimides and modified polyamideimides. More preferably, it is at least one selected from the group consisting of polyimides and polyamideimides. Among these, a polyimide is particularly preferred. In addition, in the present disclosure, the main component means the component with the largest content among the components constituting the object (here, the base material).

Modification in modified polyimides and modified polyamideimides includes siloxane modification, carbonate modification, fluorine modification, urethane modification, triazine modification, and phenol modification.

A filler may be added to the base material 20*a* to improve heat insulation and strength.

The shape of the base material can be selected, as appropriate, according to the shape of the fixing rotating member, and the base material can be of various shapes such as an endless belt shape, a hollow cylindrical shape, and a film shape.

In the case of a fixing belt, the thickness of the base material 20*a* is, for example, preferably from 10 μm to 100 μm, more preferably from 20 μm to 60 μm. By setting the thickness of the base material 20*a* within the above ranges, both strength and flexibility can be achieved at high levels.

In addition, on the surface of the base material 20*a* opposite to the side facing the heat generating layer 20*b*, there can be provided, for example, a layer for preventing wear of the inner peripheral surface of the fixing belt when the inner peripheral surface of the fixing belt comes into contact with other members, or a layer for improving slidability with other members.

Other members such as sliding members are arranged on the inner surface of the base material 20*a*, and the sliding load is large. Therefore, in order to ensure the durability of the base material, the base material is preferably a solid layer.

In order to improve adhesion with the heat generating layer 20*b* and wettability, the outer peripheral surface of the base material 20*a* may be subjected to surface roughening treatment such as blasting, and modification treatment such as treatment with ultraviolet light or plasma, chemical etching, and the like.

(3) Heat Generating Layer

The heat generating layer 20*b* is a layer that generates heat when energized. According to the principle of heat generation by induction heating using an excitation coil, where an alternating current is supplied to an excitation coil placed near the fixing rotating member, a magnetic field is induced, an electric current is generated by the magnetic field in the heat generating layer 20*b* of the fixing rotating member, and Joule heat is generated. The heat generating layer extends in the circumferential direction of the outer circumferential surface of the base material.

The heat generating layer contains silver. Silver has a low volume resistivity and is not easily oxidized. The content of silver with respect to the entire heat generating layer 20*b* is preferably 90.0% by mass or more, more preferably 99.0% by mass or more, and particularly preferably 99.9% by mass or more. The upper limit is, for example, 99.999% by mass or less and 99.99% by mass or less.

The volume resistivity of the heat generating layer 20*b* is preferably in the range of from $1.0\times10^{-8}$ Ω·m to $8.0\times10^{-8}$ 22·m, from $2.0\times10^{-8}$ $^{22}$·m to $7.0\times10^{-8}$ Ω·m, and from $2.0\times10^{-8}$ Ω·m to $6.0\times10^{-8}$ Ω·m.

The thickness of the heat generating layer 20*b* is preferably 5 μm or less. This is because it is desirable to give the fixing rotating member an appropriate degree of flexibility and to reduce heat capacity thereof. Yet another advantage is an improvement in bending resistance. As shown in FIG. 3, the fixing rotating member 20 is rotationally driven while being pressed by the film guide 25 and the pressure roller 21.

Each time the fixing rotating member 20 rotates, it is pressurized and deformed and receives stress at the nip portion N.

It is preferable to design the heat generating layer 20*b* of the fixing rotating member 20 so that no fatigue fracture occurs even if the repeated bending continues until the durability life of the fixing device. Reducing the thickness of the heat generating layer 20*b* greatly improves the resistance of the heat generating layer 20*b* to fatigue fracture. This is because the thinner the heat generating layer 20*b*, the smaller the internal stress acting on the heat generating layer 20*b* when the heat generating layer 20*b* is pressed and deformed along the curved surface of the film guide 25.

For the above reasons, it is preferable to set the thickness of the heat generating layer 20*b* to 5 μm or less from the viewpoint of reducing the heat capacity and further improving resistance to fatigue fracture. Examples of the thickness of the heat generating layer 20*b* include from 1 μm to 5 μm, from 2 μm to 5 μm, and from 2 μm to 4 μm.

The heat generating layer 20*b* extends in the circumferential direction of the outer peripheral surface of the base material 20*a*. The heat generating layer 20*b* may be configured in a predetermined pattern as long as it can generate heat when energized. In particular, a configuration in which a plurality of heat generating layers 20*b* shaped by rings in the circumferential direction of the fixing rotating member as shown in FIG. 4 is formed in an electrically divided state in the rotation axis direction is preferable from the viewpoint of safety. By adopting such a configuration, it is possible to suppress a local temperature rise when a crack occurs in the heat generating layer 20*b*. The ring shape preferably has a substantially constant width in the axial direction of the rotating body.

However, where such a pattern configuration is adopted, the surface area of the heat generating layer 20*b* increases and the risk of deterioration due to oxidation increases, so silver is used.

From the viewpoint of manufacturability and heat generation, the width of the ring of the heat generating layer 20*b* is preferably 100 μm or more, more preferably 200 μm or more, and even more preferably 300 μm or more. From the viewpoint of heat generation unevenness and safety, the width is preferably 1000 μm or less, more preferably 900 μm or less, and even more preferably 700 μm or less. The width of the ring can be, for example, from 100 μm to 1000 μm, from 200 μm to 900 μm, and from 300 μm to 700 μm.

From the viewpoint of manufacturability and heat generation, the distance between the rings of the heat generating layer 20*b* is preferably 50 μm or more, and more preferably 100 μm or more. From the viewpoint of heat generation unevenness, the distance is preferably 400 μm or less, and more preferably 300 μm or less. The distance between the rings may be, for example, from 50 μm to 400 μm and from 100 μm to 300 μm.

The heat generating layer has voids. Specifically, at least one void is present in a cross section in a direction along the circumferential direction of the heat generating layer. The presence of voids in the heat generating layer improves durability by providing an anchor effect when forming a protective layer. From the viewpoint of electrical conductivity and durability of electrical conductivity, it is preferable to adjust the amount and size of the voids.

Methods for providing voids in the heat generating layer 20*b* include, for example, forming a pattern on the heat generating layer 20*b* by a photolithography process, and then opening holes by chemical etching, or opening holes using a laser or focused ion beam. In the present disclosure, the formation of voids using a silver nanoparticle material will be described in particular.

Figure 8A:
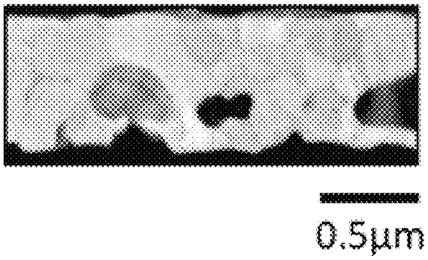
FIGS. 8A and 8B are cross-sectional views of a heat generating layer.
Figure 8B:

The heat generating layer is preferably a baked coating film of silver nanoink. When a coating material containing silver nanoparticles with a particle size of about from 10 nm to 50 nm is used to form the film, the particles are stacked as shown in FIG. 8A. Because of the instability of the surface energy of nanoparticles, the particles are fused together even when baked at a low temperature of about 100° C., and a film can be formed with nano-sized voids as shown in FIG. 8B. The size and number of voids can be expressed as a void ratio.

Specifically, the proportion of voids (void ratio) in a cross section of the heat generating layer, which is measured by observing the cross section cut in the thickness direction of the heat generating layer sampled from the fixing rotating member, is preferably from 15% by area to 50% by area, more preferably from 15% by area to 45% by area, and even more preferably from 17% by area to 40% by area.

The void ratio can be increased by increasing the temperature when baking the heat generating layer. The void ratio can be decreased by decreasing the temperature when baking the heat generating layer.

The void ratio of the heat generating layer is determined as follows.

First, a sample for evaluation is prepared. A sample with a length of 5 mm, a width of 5 mm, and a thickness of the entire thickness of the fixing rotating member is taken from a freely selected point of the fixing rotating member. The cross section of the obtained sample in the circumferential direction of the fixing rotating member is polished using an ion beam. At this time, the processing position is adjusted so that the cross section in the circumferential direction of the heat generating layer is exposed by the ion beam polishing.

An ion milling device (product name: IM4000, manufactured by Hitachi High-Technologies Corporation) can be used to polish the cross section with an ion beam. Polishing the cross section with an ion beam can prevent the filler from falling off from the sample and an abrasive from being mixed into the sample. In addition, a cross section with few polishing marks can be formed. Next, the cross section of the heat generating layer is observed with a scanning electron microscope (SEM) (product name: JSM-F100, manufactured by JEOL Ltd.) to obtain a cross-sectional image.

Observation conditions are a backscattered electron image mode at a magnification of 20000, and backscattered electron image acquisition conditions are an acceleration voltage of 3.0 kV and a working distance of 3 mm.

Then, the obtained image is cut out into a range of 0.5 μm×0.5 μm using commercially available image software. Then, binarization is performed so that the crystal grain portion of the silver-containing metal in this cut-out image is white and the portion other than the crystal grains is black. As a binarization method, for example, the Otsu method can be used.

Specifically, first, a backscattered electron image is read with an image analysis software ImageProPlus manufactured by Media Cybernetics, Inc., the image is cut out into a range of 0.5 μm×0.5 μm, and brightness distribution of the image is obtained. Next, the brightness range of the obtained brightness distribution is set, thereby making it possible to perform binarization that distinguishes between the crystal grains of the silver-containing metal and the portions other than the crystal grains.

A method for calculating the void ratio from the binary image of the cross section of the heat generating layer thus obtained will be explained hereinbelow. Since digital image processing technology is applied to these images, it is assumed that all images are in a general digital image format in which pixels are arranged in a grid pattern. Further, the binary images are grayscale images containing only brightness information, and images obtained by subsequently performing image processing on these images are all grayscale images of the same format unless otherwise specified.

In the binary image obtained by the above procedure, each grain of the silver-containing metal crystal is shown as a white area, and the area occupied by each of these crystal grains in the image is calculated. Specifically, the number of pixels constituting each crystal grain is calculated, and the total number of pixels is calculated. The area occupied by the crystal grains can be calculated by multiplying this total number of pixels by the area of one pixel, 0.15×0.15 $\mu m^2$.

The void ratio indicates the proportion of space not occupied by the crystal grains, so using the area occupied by the crystal grains calculated above, it can be expressed as follows:

$$\text{Void ratio}=(0.5\times0.5\ (\mu m^2)-\text{area occupied by crystal grains}(\mu m^2))/0.5\times0.5\ (\mu m^2)\times100.$$

The above void ratio calculation is performed for 20 areas of 0.5 μm×0.5 μm in size of the cross-sectional image of the heat generating layer, and the average void ratio obtained by arithmetic averaging is taken as the void ratio of the heat generating layer.

As described above, when analysis is performed with an X-ray photoelectron spectroscopy device, tellurium oxide peaks are confirmed throughout the entire thickness of the heat generating layer. In addition, in each analysis at 375 nm intervals using the X-ray photoelectron spectroscopy device, the ratio (atomic %) of the elemental intensity of Te to the elemental intensities of C, N, O, Si, Cl, Ag, and Te is preferably from 0.1 atomic % to 20.00 atomic %, and more preferably from 0.10 atomic % to 10.00 atomic %.

A heat generating layer containing tellurium oxide in this manner can be formed, for example, by impregnating the heat generating layer with a solution containing tellurium. Possible application methods include dipping, spraying, flow coating, contact application using a sponge, and the like. In the present disclosure, an application method using a sponge will be described.

A hydrochloric acid solution in which tellurium is dissolved is prepared as the tellurium solution, and the tellurium solution is impregnated into the heat generating layer. For example, the tellurium solution is impregnated into a urethane sponge, and the surface of the heat generating layer is traced. The concentration of tellurium in the tellurium solution is, for example, from 0.01% by mass to 0.30% by mass. The concentration of hydrochloric acid is, for example, from 0.1% by mass to 3.0% by mass. After tracing evenly, it is preferable to rinse with purified water and remove the remaining moisture by blowing with $N_2$. Thereafter, the impregnated layer is placed on a preheated hot plate and dried, for example, by holding at 120° C. to 180° C. for 5 min to 60 min. Because of the presence of voids, the moisture that cannot be removed by blowing with $N_2$ can be removed by drying.

Then, the heat generating layer is heated. The heating temperature is 200° C. or higher, preferably from 200° C. to 300° C., and more preferably from 220° C. to 260° C. The heating time is preferably from 1 h to 100 h and from 10 h to 60 h. For example, a laminate including the heat generating layer is placed in an oven with an air atmosphere, and the heat treatment state is maintained at 240° C. for 48 h. By going through these steps, a part of the tellurium sublimes and reattaches as tellurium oxide, so that tellurium oxide can be formed in the entire heat generating layer. When the void ratio of the heat generating layer is in the above-mentioned range, tellurium oxide is easily formed in the entire heat generating layer.

That is, a method for manufacturing the fixing rotating member preferably includes the steps of:

preparing a laminate in which the heat generating layer is formed on the base material;

impregnating the heat generating layer with a tellurium solution including tellurium from the surface side of the heat generating layer opposite to the side facing the base material; and heating to 200° C. or higher after impregnation with the tellurium solution.

The step of preparing the laminate includes, for example, a step of obtaining a base material, and a step of applying a silver nanoparticle ink to the outer peripheral surface of the obtained base material and baking to obtain a heat generating layer.

The step of obtaining the base material is not particularly limited. For example, it can be a base material having an endless belt shape or a roller shape. For example, a base material can be obtained by applying a resin material of the base material to the surface of a mold such as a cylindrical mold and heating as necessary.

Next, a silver nanoparticle ink is applied to the outer peripheral surface of the obtained base material and baked (sintered) to form a heat generating layer. The baking temperature is not particularly limited, but is preferably from 150° C. to 450° C., and more preferably from 250° C. to 350° C. That is, the heat generating layer is preferably a baked body (sintered body) of silver nanoparticles. The baking time is also not particularly limited, and is, for example, from 10 min to 120 min.

(4) Resin Layer

In the present disclosure, the portion including the protective layer 20*e*, the elastic layer 20*c*, the adhesive layer 20*f*, and the surface layer 20*d* may be expressed as a resin layer. The resin layer may be only one protective layer or only one surface layer.

(5) Protective Layer

The fixing rotating member may be provided with a protective layer on the surface side of the heat generating layer opposite to the side facing the base material. The protective layer 20*e* protects the heat generating layer 20*b* and has the functions of preventing oxidation of the heat generating layer 20*b*, ensuring insulation, and improving strength.

The material constituting the protective layer 20*e* is not particularly limited. The material of the protective layer 20*e* is preferably a layer containing at least a resin. When the belt is used in an electromagnetic induction type fixing device, similar to the base material 20*a*, the protective layer 20*e* is preferably a layer that has little change in physical properties and maintains high strength when the heat generating layer 20*b* generates heat.

For this reason, the protective layer 20*e* preferably contains a heat-resistant resin, more preferably contains a heat-resistant resin as a main component, and is preferably composed of a heat-resistant resin. The heat-resistant resin is, for example, a resin that does not melt or decompose at a temperature of less than 200° C. (preferably less than 250° C.).

The resin constituting the protective layer 20*e* preferably contains at least one selected from the group consisting of polyimides (PI), polyamideimides (PAI), modified polyimides, and modified polyamideimides. More preferably, it is at least one selected from the group consisting of polyimides and polyamideimides. The modification is the same as that described for the base material 20*a*.

Among these, a polyimide is particularly preferred. The main component means the component with the largest content among the components constituting the object (here, the protective layer). A method of forming the base material 20*a* and the protective layer 20*e* is not particularly limited. For example, an imide-based material in a liquid state called varnish can be coated and baked by a known method to form a film.

From the viewpoint of heat conductivity, the protective layer 20*e* may contain a thermally conductive filler. By improving heat conductivity, the heat generated in the heat generating layer 20*b* can be efficiently transferred to the outer surface of the fixing rotating member.

The thickness of the protective layer 20*e* is preferably from 10 μm to 100 μm, and more preferably from 20 μm to 60 μm. From the viewpoint of bending resistance of the heat generating layer 20*b*, the thickness of the protective layer 20*e* is preferably the same as the thickness of the base material 20*a*. For example, the ratio of the difference in thickness between the base material and the protective layer to the thickness of the base material is preferably 20% or less, 10% or less, or 5% or less. This is because by reducing the difference in thickness, even when the heat generating layer 20*b* is repeatedly bent at the nip portion, the stress applied to the heat generating layer 20*b* is evenly distributed, thereby suppressing the occurrence of cracks in the heat generating layer 20*b*.

(6) Elastic Layer

The fixing rotating member may have an elastic layer 20*c* on the outer surface of the protective layer 20*e*. The elastic layer 20*c* is a layer for imparting flexibility to the fixing rotating member in order to ensure a fixing nip in the fixing device. When the fixing rotating member is used as a heating member that contacts the toner on the paper, the elastic layer 20*c* also functions as a layer for imparting flexibility so that the surface of the heating member can follow the unevenness of the paper.

The elastic layer 20*c* includes, for example, rubber as a matrix and particles dispersed in the rubber. More specifically, the elastic layer 20*c* preferably contains rubber and a thermally conductive filler and is preferably composed of a cured product obtained by curing a composition including at least a rubber raw material (base polymer, crosslinking agent, and the like) and a thermally conductive filler.

From the viewpoint of exhibiting the functions of the elastic layer 20*c* described above, the elastic layer 20*c* is preferably composed of a cured silicone rubber containing thermally conductive particles, and is more preferably composed of a cured product of an addition-curable silicone rubber composition.

The silicone rubber composition can contain, for example, thermally conductive particles, a base polymer, a cross-linking agent, a catalyst, and, if necessary, additives. Since most silicone rubber compositions are liquid, the thermally conductive filler is easily dispersed, and by adjusting the degree of cross-linking according to the type and addition amount of the thermally conductive filler, it is easy to adjust the elasticity of the elastic layer 20*c* to be produced.

The matrix functions to develop elasticity in the elastic layer 20*c*. The matrix preferably contains silicone rubber from the viewpoint of exhibiting the function of the elastic layer 20*c* described above. Silicone rubber is preferable because it has high heat resistance so that flexibility can be maintained even in an environment where the non-paper-passing area reaches a high temperature of about 240° C. As the silicone rubber, for example, a cured product of an addition-curable liquid silicone rubber composition described hereinbelow can be used. The elastic layer 20*c* can be formed by applying and heating a liquid silicone rubber composition by a known method.

A liquid silicone rubber composition usually contains the following components (a) to (d):

Component (a): an organopolysiloxane having an unsaturated aliphatic group;

Component (b): an organopolysiloxane having active hydrogen bonded to silicon;

Component (c): a catalyst;

Component (d): a thermally conductive filler

Each component will be described below.

Component (a)

An organopolysiloxane having an unsaturated aliphatic group is an organopolysiloxane having an unsaturated aliphatic group such as a vinyl group, and examples thereof include those represented by the following formulas (1) and (2).

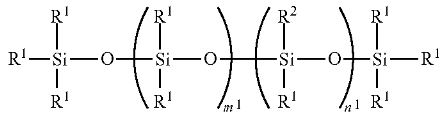
(1)

In formula (1), $m^1$ represents an integer of 0 or more, and $n^1$ represents an integer of 3 or more. Further, in structural formula (1), each $R^1$ independently represents a monovalent unsubstituted or substituted hydrocarbon group containing no unsaturated aliphatic group, provided that at least one of $R^1$ represents a methyl group and each $R^2$ independently represents an unsaturated aliphatic group.

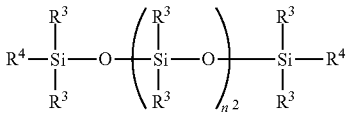
(2)

In formula (2), $n^2$ represents a positive integer, and each $R^3$ independently represents a monovalent unsubstituted or substituted hydrocarbon group containing no unsaturated aliphatic group, provided that at least one of $R^3$ represents a methyl group, and each $R^4$ independently represents an unsaturated aliphatic group.

In formulas (1) and (2), examples of the monovalent unsubstituted or substituted hydrocarbon group containing no unsaturated aliphatic group, which can be represented by $R^1$ and $R^3$, include the following groups.

Unsubstituted Hydrocarbon Group

Alkyl group (for example, methyl group, ethyl group, propyl group, butyl group, pentyl group, and hexyl group).

Aryl group (for example, phenyl group).

Substituted Hydrocarbon Group

Substituted alkyl group (for example, chloromethyl group, 3-chloropropyl group, 3,3,3-trifluoropropyl group, 3-cyanopropyl group, and 3-methoxypropyl group).

The organopolysiloxanes represented by formulas (1) and (2) have at least one methyl group directly bonded to the silicon atom forming the chain structure. However, 50% or more of each of $R^1$ and $R^3$ are preferably methyl groups, and more preferably all $R^1$ and $R^3$ are methyl groups, for ease of synthesis and handling.

Also, examples of unsaturated aliphatic groups that can be represented by $R^2$ and $R^4$ in formulas (1) and (2) include the following groups. Examples of unsaturated aliphatic groups include a vinyl group, an allyl group, a 3-butenyl group, a 4-pentenyl group, and a 5-hexenyl group. Among these groups, both $R^2$ and $R^4$ are preferably vinyl groups because synthesis and handling are facilitated, cost is reduced, and a cross-linking reaction can be easily performed.

From the standpoint of moldability, the component (a) preferably has a viscosity of from 1000 $mm^2/s$ to 50000 $mm^2/s$. Where the viscosity is less than 1000 $mm^2/s$, it will be difficult to adjust the hardness to the level required for the elastic layer 20*c*, and where the viscosity is more than 50000 $mm^2/s$, the viscosity of the composition will be too high, making coating difficult. Viscosity (kinetic viscosity) can be measured using a capillary viscometer, a rotational viscometer, or the like, based on JIS Z 8803:2011.

The blending amount of component (a) is preferably 55% by volume or more from the viewpoint of durability and 65% by volume or less from the viewpoint of heat transfer, based on the liquid silicone rubber composition used to form the elastic layer 20*c*.

Component (b)

The organopolysiloxane having active hydrogen bonded to silicon functions as a cross-linking agent that reacts with the unsaturated aliphatic group of component (a) under the action of a catalyst to form a cured silicone rubber.

Any organopolysiloxane having a Si—H bond can be used as the component (b). In particular, from the viewpoint of reactivity with the unsaturated aliphatic group of component (a), an organopolysiloxane having an average number of silicon-bonded hydrogen atoms of 3 or more per molecule is preferably used.

Specific examples of component (b) include linear organopolysiloxane represented by formula (3) below and cyclic organopolysiloxane represented by formula (4) below.

(3)

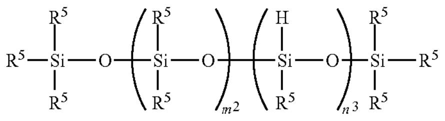

In formula (3), $m^2$ represents an integer of 0 or more, $n^3$ represents an integer of 3 or more, and $R^5$ each independently represents a monovalent unsubstituted or substituted hydrocarbon group containing no unsaturated aliphatic group.

(4)

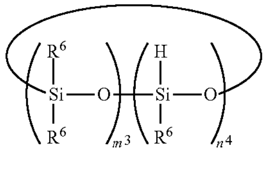

In formula (4), $m^3$ represents an integer of 0 or more, $n^4$ represents an integer of 3 or more, and $R^6$ each independently represents a monovalent unsubstituted or substituted hydrocarbon group containing no unsaturated aliphatic group.

Examples of monovalent unsubstituted or substituted hydrocarbon groups containing no unsaturated aliphatic group that can be represented by $R^5$ and $R^6$ in formulas (3) and (4) include the same groups as those mentioned above for $R^1$ in structural formula (1). Among these, it is preferable that 50% or more of each of $R^5$ and $R^6$ be a methyl group and more preferably all $R^5$ and $R^6$ are methyl groups because synthesis and handling are easy and excellent heat resistance is easily obtained.

Component (c)

Examples of the catalyst used to form the silicone rubber include a hydrosilylation catalyst for accelerating the curing reaction. Known substances such as platinum compounds and rhodium compounds can be used as hydrosilylation catalysts. The blending amount of the catalyst can be appropriately set and is not particularly limited.

Component (d)

Examples of thermally conductive fillers include metals, metal compounds, and carbon fibers. Fillers that are highly thermally conductive are more preferred, and specific examples thereof include the following materials.

Silicon metal (Si), silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), copper (Cu), aluminum (Al), silver (Ag), iron (Fe), nickel (Ni), vapor grown carbon fiber, PAN-based (polyacrylonitrile) carbon fiber, pitch-based carbon fiber.

These fillers can be used alone or in combination of two or more.

The average particle size of the filler is preferably from 1 μm to 50 μm from the viewpoint of handling and dispersibility. As for the shape of the filler, spherical, pulverized, acicular, plate-shaped and whisker-shaped fillers can be used. In particular, from the viewpoint of dispersibility, the filler is preferably spherical. Furthermore, at least one of reinforcing filler, heat-resistant filler and coloring filler may be added.

(7) Adhesive Layer

The fixing rotating member may have an adhesive layer 20*f* on the outer surface of the elastic layer 20*c* for adhering the surface layer 20*d*, which will be described hereinbelow. The adhesive layer 20*f* is a layer for bonding the elastic layer 20*c* and the surface layer 20*d*. The adhesive used for the adhesive layer 20*f* can be appropriately selected from known ones and used, and is not particularly limited. However, from the viewpoint of ease of handling, it is preferable to use an addition-curable silicone rubber blended with a self-adhesive component.

This adhesive can include, for example, a self-adhesive component, an organopolysiloxane having a plurality of unsaturated aliphatic groups represented by vinyl groups in molecular chain thereof, a hydrogen organopolysiloxane, and a platinum compound as a crosslinking catalyst. The adhesive layer 20*f* that bonds the surface layer 20*d* to the elastic layer 20*c* can be formed by curing, by an addition reaction, the adhesive applied to the surface of the elastic layer 20*c*.

Examples of the self-adhesive component include the following.

A silane having at least one, preferably two or more functional groups selected from the group consisting of an alkenyl group such as vinyl group, a (meth)acryloxy group, a hydrosilyl group (SiH group), an epoxy group, an alkoxysilyl group, a carbonyl group, and a phenyl group.

An organosilicon compound such as a cyclic or straight-chain siloxane having from 2 to 30 silicon atoms, preferably from 4 to 20 silicon atoms.

A non-silicon (that is, containing no silicon atoms in the molecule) organic compound which may contain an oxygen atom in the molecule. However, such compound contains from 1 to 4, preferably 1 or 2 aromatic rings such as a phenylene structure having a valence of from 1 to 4, preferably from 2 to 4, in one molecule.

In addition, at least one, preferably from two to four functional groups (for example, alkenyl group, (meth)acryloxy group) capable of contributing to a hydrosilylation addition reaction is contained in one molecule.

The above self-adhesive components may be used singly or in combination of two or more. From the viewpoint of adjusting viscosity and ensuring heat resistance, a filler component can be added to the adhesive within a range consistent with the gist of the present disclosure. Examples of the filler component include the following.

Silica, alumina, iron oxide, cerium oxide, cerium hydroxide, carbon black, and the like.

The compounding amount of each component contained in the adhesive is not particularly limited, and can be set as appropriate.

Such addition-curable silicone rubber adhesives have been marketed and are readily available. The thickness of the adhesive layer 20*f* is preferably 20 μm or less. By setting the thickness of the adhesive layer 20*f* to 20 μm or less, when the fixing belt according to the present embodiment is used as a heating belt in a thermal fixing device, the heat resistance can be easily set to be small, and the heat from the inner surface is likely to be efficiently transferred to a recording medium.

(8) Surface Layer

The fixing rotating member may have a surface layer 20*d*. The surface layer 20*d* preferably contains a fluororesin in order to function as a release layer that prevents toner from adhering to the outer surface of the fixing rotating member. The surface layer 20*d* may be formed by, for example, using a tubular shape obtained by molding a resin exemplified below, or by coating a resin dispersion liquid to mold the surface layer 20*d*.

Tetrafluoroethylene-perfluoro (alkyl vinyl ether) copolymers (PFA), polytetrafluoroethylene (PTFE), tetrafluoroethylene-hexafluoropropylene copolymer (FEP), and the like.

Among the resin materials exemplified above, PFA are particularly preferably used from the viewpoint of moldability and toner releasability.

The thickness of the surface layer 20*d* is preferably from 10 μm to 50 μm. By setting the thickness of the surface layer 20*d* within this range, it is easy to maintain an appropriate surface hardness of the fixing rotating member.

As described above, according to one aspect of the present disclosure, there is provided a fixing device in which a fixing rotating member is arranged. Therefore, it is possible to provide a fixing device in which a fixing rotating member having high conductivity and excellent durability is arranged.

The present disclosure also provides a conductive member having a base material and a heat generating layer on the base material. The base material and the heat generating layer are as described above. Such a conductive member can suppress an increase in resistance at high temperatures.

EXAMPLES

The present disclosure will be described in more detail hereinbelow using examples, but the present invention is not limited to these examples.

Example 1

The surface of a cylindrical stainless steel mold with an outer diameter of 30 mm was subjected to release treatment, and a commercially available polyimide precursor solution (U varnish S, manufactured by Ube Industries, Ltd.) was applied by a dipping method to form a coating film. Next, this coating film was dried at 140° C. for 30 min to volatilize the solvent in the coating film, and then baked at 200° C. for 30 min and at 400° C. for 30 min to imidize and form a polyimide film base material with a thickness of 40 μm and a length of 300 mm.

Next, on this polyimide film, a ring-shaped pattern with a width of 300 μm and an interval of 200 μm was formed by an inkjet method using an ink containing silver nanoparticles (DNS169I, manufactured by Daicel Corporation). After that, baking was performed at 300° C. for 30 min to form a heat generating layer 20*b* with a thickness of 3 μm.

Then, tellurium oxide was formed in the entire heat generating layer by the following method.

A hydrochloric acid solution in which tellurium was dissolved was prepared (the concentration of tellurium is 0.20% by mass and the concentration of hydrochloric acid is 2.0% by mass) and impregnated into a urethane sponge, and the surface of the heat generating layer was traced. After tracing evenly, rinsing with purified water was performed to remove the remaining moisture by blowing with $N_2$. Thereafter, the impregnated layer was placed on a preheated hot plate and dried by holding at 150° C. for 10 min. Then, the heat generating layer was placed in an oven with an air atmosphere and heat treated at 240° C. for 48 h. By going through these steps, tellurium oxide could be formed in the entire heat generating layer.

Then, a PAI solution (Viromax HR-16NN, manufactured by Toyobo Co., Ltd.) was coated on the entire surface of the heat generating layer 20*b* by ring coating. Baking was then performed at 230° C. for 30 min to form a protective layer 20*e* with a thickness of 40 μm in the center and 40 μm at the edges.

Next, a primer (trade name: DY39-051A/B, manufactured by Dow Toray Industries, Inc.) was applied substantially uniformly to the outer peripheral surface of the protective layer 20*e* so that the dry weight was 20 mg. Baking treatment was performed for 30 min in an electric furnace set to 160° C.

A silicone rubber composition layer having a thickness of 250 μm was formed on this primer by the ring coating method, and after primary crosslinking at 160° C. for 1 min, secondary crosslinking was performed at 200° C. for 30 min to form an elastic layer 20*c*.

The following silicone rubber composition was used.

As an organopolysiloxane having an alkenyl group and serving as component (a), a vinylated polydimethylsiloxane having at least two vinyl groups in one molecule (trade name: DMS-V41, manufactured by Gelest Co., Ltd., number-average molecular weight 68000 (polystyrene equivalent), molar equivalent of vinyl group 0.04 mmol/g) was prepared.

In addition, as an organopolysiloxane having Si—H groups and serving as component (b), methyl hydrogen polysiloxane having at least two Si—H groups in one molecule (trade name: HMS-301, manufactured by Gelest Co., Ltd., number average molecular weight 1300, (polystyrene equivalent), molar equivalent of Si—H group 3.60 mmol/g) was prepared. A total of 0.5 parts by mass of component (b) was added to 100 parts by mass of component (a) and thoroughly mixed to obtain an addition curable silicone rubber raw liquid.

Further, a small amount of component (c) of addition curing reaction catalyst (platinum catalyst: platinum carbonylcyclovinylmethylsiloxane complex) and an inhibitor were added and thoroughly mixed.

With this addition-curable silicone rubber raw liquid, high-purity spherical alumina (trade name: ALNABEADS CB-A10S; manufactured by Showa Titanium Co., Ltd.) was blended and kneaded as a thermally conductive filler serving as component (d) in a volume ratio of 45% based on the elastic layer. After curing, an addition-curable silicone rubber composition having a JIS K 6253A-compliant durometer hardness of 10° was obtained.

Next, on the elastic layer 20*c* thus obtained, an addition-curable silicone rubber adhesive (trade name: SE1819CV A/B, manufactured by Dow Toray Industries, Inc.) for forming the adhesive layer 20*f* was substantially evenly applied to a thickness of approximately 20 μm. A fluororesin tube (trade name: NSE, manufactured by Gunze Ltd.) with an inner diameter of 29 mm and a thickness of 50 μm for forming the surface layer 20*d* was layered on the adhesive layer while expanding diameter thereof.

After that, the excess adhesive was squeezed out from between the elastic layer 20*c* and the fluororesin tube to a thickness of about 5 μm by uniformly squeezing the belt surface from above the fluororesin tube. Next, a fixing rotating member was obtained by curing the adhesive by heating at 200° C. for 30 min, fixing the fluororesin tube on the elastic layer 20*c*, and finally cutting out both end portions to obtain a length of 240 mm.

Example 2

A fixing rotating member was produced in the same manner as in Example 1, except that the baking temperature of the heat generating layer 20*b* was set to 250° C.

Example 3

A fixing rotating member was produced in the same manner as in Example 1, except that the baking temperature of the heat generating layer 20*b* was set to 200° C.

Example 4

A fixing rotating member was produced in the same manner as in Example 1, except that no protective layer was formed.

Comparative Example 1

A fixing rotating member was produced in the same manner as in Example 1, except that tellurium oxide was not formed in the treatment of the heat generating layer.

Comparative Example 2

A fixing rotating member was produced in the same manner as in Example 2, except that tellurium oxide was not formed in the treatment of the heat generating layer.

Comparative Example 3

The heat generating layer was produced in the same manner as in Example 3, except that tellurium oxide was not formed in the treatment of the heat generating layer.

Evaluation: Evaluation of Void Ratio

For Examples 1 to 4 and Comparative Examples 1 to 3, cross-sections of the heat generating layer 20*b* were observed using the method described above, and the void ratio was calculated. The results are shown in Tables 1-1 and 1-2.

Evaluation: Evaluation of Tellurium Oxide Content

Whether tellurium oxide was contained inside the heat generating layer was confirmed using the following method. In Examples 1 to 4, a tellurium oxide peak was confirmed throughout the entire thickness of the heat generating layer, but not observed in Comparative Examples 1 to 3.

First, a sample for evaluation was prepared. Resin layers such as the protective layer formed on the surface of the heat generating layer were removed with a cutter, and a sample in which the heat generating layer 20*b* was formed on the base layer was obtained. The sample was cut into a length of 10 mm and a width of 10 mm. The cut sample was placed on a sample stage called a platen for X-ray photoelectron spectroscopy, and the platen was placed in an ultra-high vacuum X-ray photoelectron spectroscopy device. Measurements with the X-ray photoelectron spectroscopy device were performed in an environment of 23° C.

The X-ray photoelectron spectroscopy device used was a PHI Qunatera II manufactured by ULVAC-PHI, Inc. The X-ray source used was AlKα rays, and depth direction analysis was performed using Ar sputtering in combination. The X-ray irradiation conditions were 200 μm, 50 W, and 15 kV, and the detector conditions were a pass energy of 112 eV and a Time per Step of 10 ms. The Ar sputtering conditions were set to process a range of 2 mm×2 mm at an acceleration voltage of 4 kV. The processing rate was 37.5 nm/min. The above-mentioned heat generating layer with a known thickness was sputtered under the same conditions, and when the ratio of silver in the measured elements reached 50%, it was determined that the film disappeared, and the processing rate was calculated from the time it took to reach this stage.

The elements measured were C, N, O, Si, Cl, Ag, and Te. The orbitals and measured energy ranges of each element measured were as follows. C: 278-298 eV for C1s, N: 391-411 eV for Nis, O: 523-543 eV for O1s, Si: 94-114 eV for Si2p, Cl: 193-213 eV for Cl2p, Ag: 362-382 eV for Ag3d, and Te: 567-589 eV for Te3d. The number of repeated measurements was 10 for C1s, 10 for N1s, 10 for O1s, 10 for Si2p, 20 for Cl2p, 10 for Ag3d, and 15 for Te3d.

For the depth direction measurements, under the above processing conditions, the surface of the heat generating layer was measured, followed by 10 min of Ar sputtering, and the measurement was repeated 10 times. Since the processing rate was 37.5 nm/min, the analysis was performed at a pitch of 375 nm in the depth direction.

The obtained depth direction spectra were analyzed using MultiPak, which is an analysis software produced by UIVAC-PHI, Inc. First, peak shift correction was performed on all the obtained spectra. The method was as follows.

The top of the peak with the highest intensity that could be confirmed around 368 eV in the 3d spectrum of Ag was taken as Ag3d5/2, and set to 368.3 eV. This value was based on "X-ray Photoelectron Spectroscopy" (6th edition) published by Maruzen Co., Ltd.

Next, the background range was determined for each measured spectrum, and the integrated intensity (Intensity)

was calculated and divided by the instrument-specific sensitivity factor (Corrected RSF) to determine the respective intensities. The Shirley method was used for background setting. The elements and orbitals using the respective background setting ranges and instrument-specific sensitivity factors were as follows:

C: C1s at 280.0-292.0 eV, N: N1s at 396.5-404.0 eV, O: O1s at 526.0-538.0 eV, Si: Si2p at 99.7-108.0 eV, Cl: Cl2p at 194.0 eV-204.0 eV, Ag: Ag3d at 364.0-380.0 eV, and Te: Te3d3/2 at 580.0-588.5 eV. For convenience of analysis, a deviation of +0.1 eV was allowed when the ranges did not match exactly.

For Te, only the Te3d3/2 orbital was used because the 3d5/2 of Te overlaps with the Ag3p3/2 orbital.

The element ratio was calculated by dividing each calculated intensity by the intensity of the measured element and converting it into a percentage. The ratio is in at %, that is, atomic %. The Te ratio is shown as an example.

$$\text{Te ratio (at \%)} = (\text{Te intensity})/(\text{C intensity} + \text{N intensity} + \text{O intensity} + \text{Si intensity} + \text{Cl intensity} + \text{Ag intensity} + \text{Te intensity}) \times 100.$$

Since the detection limit of X-ray photoelectron spectroscopy is 0.1 at %, as described in the above "X-Ray Photoelectron Spectroscopy" (6th edition), it was determined that the Te element was present when Te was 0.1 at % or more using the above calculation method.

The presence of $TeO_2$ was further determined by referring to the literature ("Analysis of Te and $TeO_2$ on CdZnTe Nuclear Detectors Treated with Hydrogen Bromide and Ammonium-Based Solutions"). This literature indicates that the 3d3/2 derived from Te forms a peak top at 583.5 eV, and the 3d3/2 derived from $TeO_2$ forms a peak top at 586.5 eV. Therefore, after forming a background at 580.0-588.5 eV using the Shirley method, the peaks were placed at 583.5 eV and 586.5 eV, and automatic fitting was performed. The intensity ratio of Te and $TeO_2$ was calculated by automatic fitting. The ratio of $TeO_2$ in Te was calculated by multiplying the intensity of the Te element by the $TeO_2$ intensity ratio, and if this value was 0.1 or more, it was determined that $TeO_2$ was present inside the heat generating layer.

Where the ratio of $TeO_2$ in Te was 0.1 or more at all positions where the ratio of Ag element exceeded 50.0 at % among all elements in each analysis at 375 nm intervals, it was determined that a tellurium oxide peak was confirmed throughout the entire thickness of the heat generating layer.

Evaluation: High-Temperature Storage

The fixing rotating members obtained in Examples 1 to 4 and Comparative Examples 1 to 3 were stored at 240° C. under atmospheric pressure for 200 h. This storage temperature was set based on the assumed overheating temperature in the non-paper-passing area under a special usage environment (when small size paper is printed continuously) when the fixing rotating member is actually incorporated into a fixing device and used. When the fixing rotating member under the same conditions as in Comparative Example 1 was heated at 200° C. for 200 h, the increase in resistance was less than 5% in the resistance measurement described hereinbelow.

Evaluation: Resistance Measurement

The resistance evaluation was performed using a contact resistance measurement. The produced fixing rotating member was cut in half, one half was used for initial resistance evaluation and the other half was used for evaluation after heating. When measuring the resistance, the resin layer portion was peeled off with a cutter and the measurement was performed using a four-terminal resistance measurement method. Details of the resistance measurement are described hereinbelow.

The resistance was measured using resistance meter 3541 manufactured by HIOKI E. E. Corporation and two FPC-GS-500 probes manufactured by FormFactor, Inc. The mode was set to a low power mode, and the probes were pressed against the heat generating layer so that the distance between the sense probes was 20 mm to measure the resistance value. The volume resistance value was obtained by conversion from the width and film thickness of the heat generating layer.

The same measurements were performed before and after heating, and the value before heating was used as the initial value, an increase in volume resistance from the initial value of less than 5% was evaluated as A, and an increase of 5% or more was evaluated as B.

TABLE 1-1

| | Heat generating layer | | | | | | | Resin layer | | | | | | | |
|---|---|---|---|---|---|---|---|---|---|---|---|---|---|---|---|
| | Base material | | | | Conductive layer | Formation | | Protective layer | | Elastic layer | | Adhesive layer | | Surface layer | |
| Example No. | Type of resin | T µm | Type of metal | T µm | Baking temperature ° C. | of tellurium oxide | Void ratio % | Type of resin | T µm | Type of resin | T µm | Type of adhesive | T µm | Type of resin | T µm |
| 1 | PI | 40 | Ag | 3 | 300 | Yes | 40 | PAI | 40 | Silicone rubber | 250 | Silicone rubber adhesive | 20 | Fluoro resin | 50 |
| 2 | PI | 40 | Ag | 3 | 250 | Yes | 25 | PAI | 40 | Silicone rubber | 250 | Silicone rubber adhesive | 20 | Fluoro resin | 50 |
| 3 | PI | 40 | Ag | 3 | 200 | Yes | 17 | PAI | 40 | Silicone rubber | 250 | Silicone rubber adhesive | 20 | Fluoro resin | 50 |
| 4 | PI | 40 | Ag | 3 | 300 | Yes | 40 | none | — | Silicone rubber | 250 | Silicone rubber adhesive | 20 | Fluoro resin | 50 |

TABLE 1-1-continued

| | Heat generating layer | | | | | | Resin layer | | | | | | | |
|---|---|---|---|---|---|---|---|---|---|---|---|---|---|---|
| | Base material | | | Conductive layer | Formation | | Protective layer | | Elastic layer | | Adhesive layer | | Surface layer | |
| Example No. | Type of resin | T μm | Type of metal | T μm | Baking temperature ° C. | of tellurium oxide | Void ratio % | Type of resin | T μm | Type of resin | T μm | Type of adhesive | T μm | Type of resin | T μm |
| C.E. 1 | PI | 40 | Ag | 3 | 300 | No | 40 | PAI | 40 | Silicone rubber | 250 | Silicone rubber adhesive | 20 | Fluoro resin | 50 |
| C.E. 2 | PI | 40 | Ag | 3 | 250 | No | 25 | PAI | 40 | Silicone rubber | 250 | Silicone rubber adhesive | 20 | Fluoro resin | 50 |
| C.E. 3 | PI | 40 | Ag | 3 | 200 | No | 17 | PAI | 40 | Silicone rubber | 250 | Silicone rubber adhesive | 20 | Fluoro resin | 50 |

TABLE 1-2

| Example No. | Initial volume resistance $\times 10^{-8}$ Ω · m | Evaluation results | Determination |
|---|---|---|---|
| 1 | 3.1 | A | The increase in resistance was less than 5% even after 200 h |
| 2 | 4.1 | A | The increase in resistance was less than 5% even after 200 h |
| 3 | 5.2 | A | The increase in resistance was less than 5% even after 200 h |
| 4 | 3.1 | A | The increase in resistance was less than 5% even after 200 h |
| C. E. 1 | 2.8 | B | The increase in resistance was 5% or more at 100 h |
| C. E. 2 | 3.7 | B | The increase in resistance was 5% or more at 100 h |
| C. E. 3 | 4.7 | B | The increase in resistance was 5% or more at 100 h |

In the Tables 1-1 and 1-2, "C.E." indicates "Comparative Example" and "T" indicates "Thickness".

From the results in Tables 1-1 and 1-2, the presence of tellurium oxide throughout the entire thickness of the heat generating layer makes it possible to suppress the increase in resistance due to heating at 240° C. and suppress the occurrence of image defects.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-003896, filed Jan. 15, 2024, which is hereby incorporated by reference herein in its entirety.

What is claimed is:

1. A fixing rotating member comprising:

a base material including a resin; and a heat generating layer on the base material, wherein:

the heat generating layer extends in a circumferential direction of an outer peripheral surface of the base material;

the heat generating layer comprises silver;

at least one void is present in a cross section of the heat generating layer in a direction along the circumferential direction; and when the heat generating layer is analyzed by an X-ray photoelectron spectroscopy device at a pitch of 375 nm in a depth direction from a surface side opposite to a side facing the base material, a tellurium oxide peak is confirmed throughout an entire thickness of the heat generating layer.

2. The fixing rotating member according to claim 1, wherein the heat generating layer is a sintered body of silver nanoparticles.

3. The fixing rotating member according to claim 1, wherein a proportion of voids in a cross section of the heat generating layer, which is measured by observing a cross section cut in the thickness direction of the heat generating layer sampled from the fixing rotating member, is from 15% by area to 50% by area.

4. A fixing device comprising:

the fixing rotating member according to claim 1, and an induction heating device that causes the fixing rotating member to generate heat by induction heating.

5. An electrophotographic image forming apparatus comprising:

an image bearing member that bears toner image;

a transfer device that transfers the toner image to a recording material; and a fixing device that fixes the transferred toner image to the recording material, wherein the fixing device is the fixing device according to claim 4.

6. A method for manufacturing the fixing rotating member according to claim 1, the method comprising the steps of:

preparing a laminate in which the heat generating layer is formed on the base material;

impregnating the heat generating layer with a tellurium solution including tellurium from the surface side of the heat generating layer opposite to the side facing the base material; and heating to 200° C. or higher after impregnation with the tellurium solution.

7. A conductive member comprising a base material and a heat generating layer on the base material, wherein:

the heat generating layer includes silver;

at least one void is present in a cross section of the heat generating layer in a thickness direction; and when the heat generating layer is analyzed by an X-ray photoelectron spectroscopy device at a pitch of 375 nm in a depth direction from a surface side opposite to a side facing the base material, a tellurium oxide peak is confirmed throughout an entire thickness of the heat generating layer.

* * * * *